June 2, 1964  S. J. JENNINGS  3,135,021
ROTARY RIB COTTON GIN
Filed Jan. 15, 1962
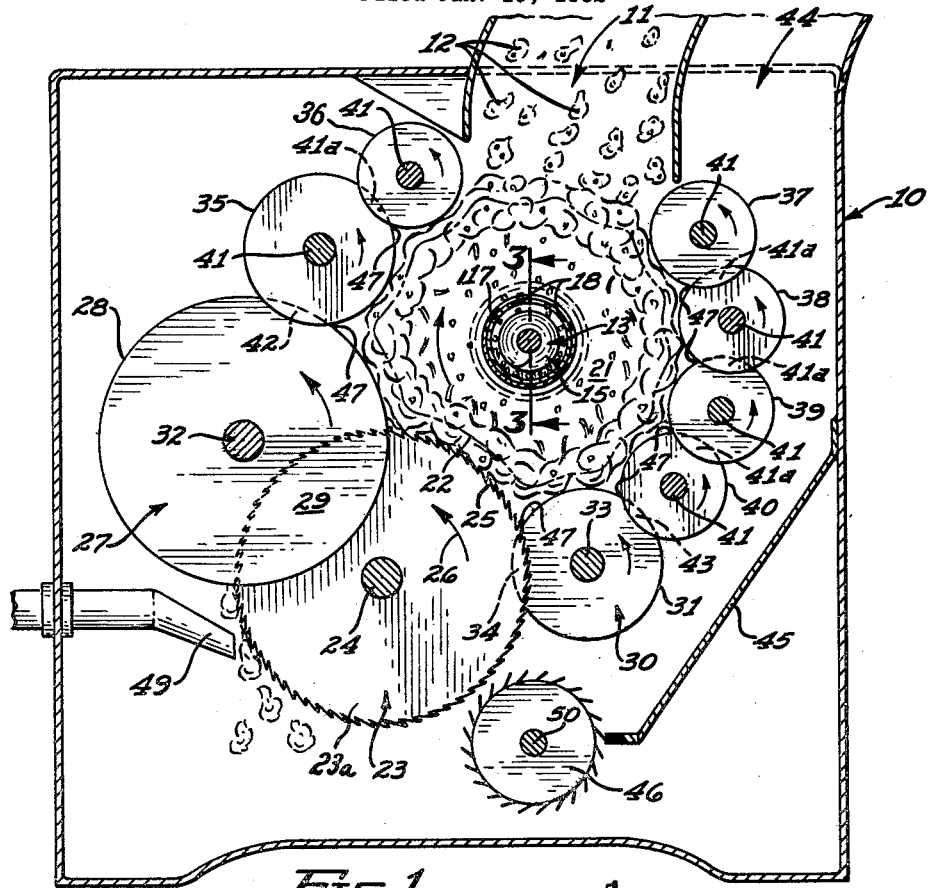
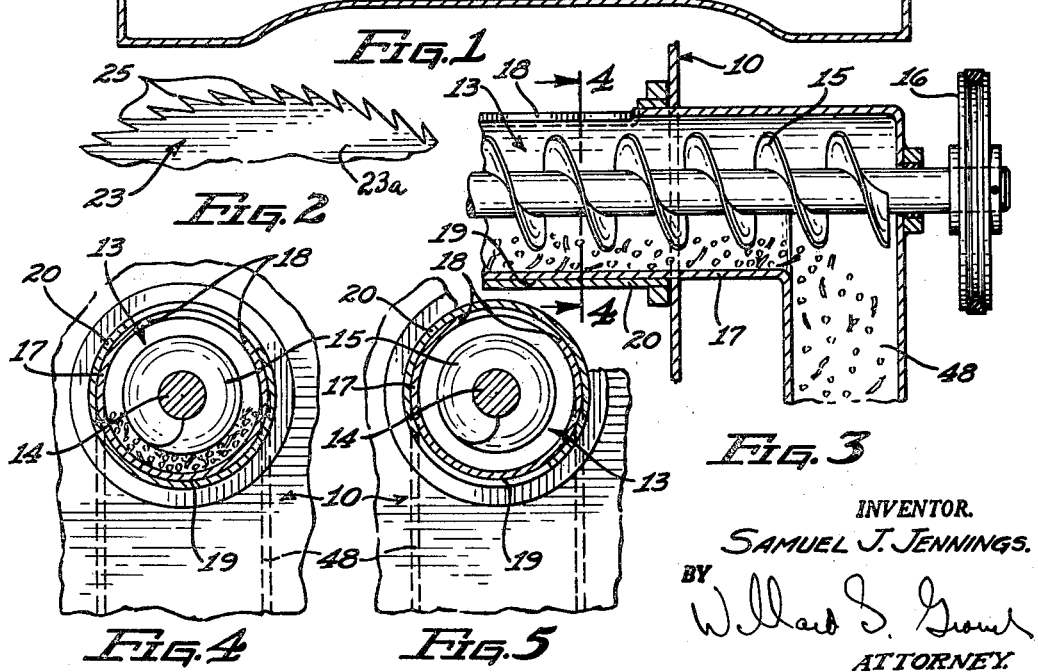
INVENTOR.
SAMUEL J. JENNINGS.
BY
ATTORNEY.

United States Patent Office 3,135,021
Patented June 2, 1964

3,135,021
ROTARY RIB COTTON GIN
Samuel J. Jennings, 3702 E. Pasadena, Phoenix, Ariz.
Filed Jan. 15, 1962, Ser. No. 166,115
3 Claims. (Cl. 19—56)

This invention pertains to cotton gins and is particularly directed to a rotary rib cotton gin.

One of the objects of this invention is to provide a cotton gin structure capable of producing a higher grade of ginned cotton.

Another object of this invention is to provide a cotton ginning method utilizing rotary ribs and rotary discs around the revolving seed cotton roll.

Still another object is to provide a cotton gin in which more saws can be placed in less space to greatly speed up the ginning operation.

A further object is to provide a cotton gin with a series of moving rotary ribs which continuously turn the seed cotton over and moves the seed away enabling all of the saw teeth to do their share of ginning.

It is also an object to provide an arrangement in a cotton gin in which the dirt can readily get out of the seed roll during the ginning operation.

Another object is to provide an improved tooth arrangement for the gin saws which will not dig into the seed.

A further object of this invention is to provide a cotton gin arrangement in which small specks of trash can get out of the gin stand at numerous places.

Another object of this invention is to provide cotton gin apparatus in which cotton will be cleaned as it is being ginned.

It is also an object to provide a method of getting rid of seed from a gin stand by use of a specially constructed roll box for the revolving seed roll.

Further features and advantages of this invention will appear from a detailed description of the drawings in which:

FIG. 1 is a general diagrammatic view of a rotary rib cotton gin incorporating the feature of this invention.

FIG. 2 is an enlarged fragmentary side elevation of a portion of a gin saw in the apparatus of FIG. 1.

FIG. 3 is an enlarged fragmentary section on the line 3—3 of FIG. 1.

FIG. 4 is an enlarged section of the line 4—4 of FIG. 3, showing the condition of the seed conveyor prior to the beginning of the actual ginning operation.

FIG. 5 is an enlarged section on the line 4—4, similar to FIG. 4 but showing the condition of the seed conveyor during the actual ginning operation.

As an example of one embodiment of this invention, there is shown a rotary rib cotton gin having a gin stand frame 10 FIG. 1, having the seed cotton drop or entrance way 11 which drops the seed cotton 12 to be ginned down and around the ginned seed conveyor 13 appropriately mounted in the frame 10. The conveyor 13 may take the form of the usual screw conveyor comprising the central shaft 14 to which is fixed the helical rib 15. A pulley 16 fixed to the shaft 14 is driven from a suitable source of power (not shown) at the required speed. Within and fixed to the gin stand frame 10 is a cylindrical housing 17 surrounding the helical rib 15 of the ginned seed conveyor 13 and an upwardly facing longitudinally extending slot 18 is formed therein. Surrounding and rotatably mounted on the periphery 19 of the cylindrical housing 17 is a cylindrical control valve 20 which may be rotated from the position shown in FIG. 4 of closure of the slot 18 to the position shown in FIG. 5 of exposure of the slot 18.

Surrounding the ginned seed conveyor 13 and spaced circumferentially therefrom are a series of rotary elements forming a cylindrical cotton roll chamber or roll box indicated generally at 21 wherein the seed cotton roll 22 revolves about the ginned seed conveyor 13. One of these elements comprises the gin saw cylinder 23 formed by a series of axially spaced saws 23a carried on the gin saw shaft 24 appropriately journaled in the gin stand frame 10. The gin saw cylinder saws 23a are provided with saw teeth 25 constructed as shown in FIG. 2 and pointing in the direction of rotation of the gin saw teeth 25 as indicated by the arrow 26.

A rotary rib cylinder 27 consisting of a series of axially spaced rotary rib discs 28a fixed on the shaft 32 is journaled in the frame 10. The series of axially spaced rotary rib discs 28 are interspaced with and overlap with the gin saws 23a in the area 29. Both the gin saws 23a and the rotary ribs 28 are closely axially spaced between each other, preferably less than the outside width of the cotton seeds to prevent their passage between the rotary ribs.

A rotary huller rib cylinder 30 has a series of rotary huller rib discs 31 mounted on a shaft 33 appropriately journaled in the frame 10, which discs overlap the saws 25 in the area 34. A series of rotary discs cylinders 35, 36, 37, 38, 39 and 40 mounted on shafts 41 appropriately journaled in the frame 10 are provided to hold the confine the roll box 21 and help in turning the seed cotton roll 22. All of the rotary disc cylinders 35—40 overlap in the areas 41a, while rotary disc 35 overlaps in the area 42 with the rotary ribs 28 and rotary disc 40 overlaps in the area 43 with the rotary huller rib discs 31.

In certain instances it may be desirable to initially feed the seed cotton to the gin in the seed drop 44 where it drops down outside the discs 37, 38, 39 and 40 and engages the huller breast sloping panel 45 at the bottom of which is the revolving spiked drum 46 carried on the shaft 50 appropriately journaled on the frame 10 which spiked drum kicks the seed cotton against the gin saws 25. The rotary huller rib cylinder 30 with disc 31 and saws 25 overlapping at 34 keep out burs and stems from passing through to the cotton roll 22. Any suitable revolving brush or lint nozzle arrangement 49 such as shown in Patent 2,973,559 may be utilized to doff the ginned cotton from the gin saws teeth 25.

There has thus been provided a unique rotary rib cotton gin comprising a series of circumferentially spaced revolving discs 30, 35, 36, 37, 38, 39 and 40, revolving saws 25, and revolving ribs 28 around the seed cotton roll so that the seed cotton roll will rotate freely and be bumped at each intersection 47 disc and disc, disc and saw, and disc and rib enabling more exposure of lint to the gin saws 25. The relatively deep penetration of the saws 25 into the rotary ribs 28 in the area 29 allow for correct slant of the saw teeth as the points of the teeth must just pass the rib first to hold the cotton until it is taken off by the doffing apparatus 49.

In instances where the ginned seed conveyor 13 is utilized inside of the revolving cotton roll 22, the rotary huller discs 31 may take the form of the standard discs 35—40 such as used in the standard brush or air jet doffing arrangement 49 since the ginned seed is removed by the conveyor 13. In another arrangement every other disc 31 of the rotary huller rib cylinder 30 is removed to allow the ginned seed to fall down through the cylinder 30. In another arrangement regular spacing of the saws 25 and ribs 28 may be made as in a standard gin and the cotton fed into the machine at 44 and against the huller breast 45 and kicked against the gin saws teeth 25 by the revolving spiked drum 46 in which instance the discs 31 and saws 23 will keep out the burs and stems.

In the operation of the machine the speed of the conveyor 13 is adjustable so that it may be speeded up after the cotton roll 22 has formed and is rotating about the conveyor 13. Preferably at the start the conveyor 13 should turn at substantially the same speed as the cotton roll 22 as caused by the rotating disc 35—40, saws 25, rotary ribs 28; and rotary huller cylinder 30 until ginning has started and then increased in speed to properly remove the ginned seed axially out to the side of the gin stand 10 where the seeds may discharge in an appropriate chute 48, FIG. 3. A fine grade of ginned cotton is thus obtained by the continuous and immediate removal of ginned seed and stems which might otherwise stay in the gin stand for days during the ginning operation. At the start of the ginning operation the conveyor control valve 20 is in closed position as shown in FIG. 5. As the ginned seed, stems and the like begin to accumulate at the center of the revolving cotton roll the valve 20 is rotated to open position, FIG. 4, to allow the conveyor 13 to withdraw seed, stems and the like from the gin stand. This method of seed removal by the conveyor 13 permits the rotary ribs 28 and saws 25 to be closely spaced a distance less than the seed size which thereby permits the speeding up of the ginning operation by the greater number of saws 25 which can be placed in the gin.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein.

Having thus fully set forth and described this invention what is claimed and desired to be obtained by United States Letters Patent is:

1. A rotary rib cotton gin comprising in combination:
   (a) a gin stand frame,
   (b) a seed cotton drop on said frame,
   (c) a ginned seed conveyor having a cylindrical housing fixed on said frame in horizontally disposed position so as to receive seed cotton dropped from said seed cotton drop down and around said conveyor including,
   (d) a conveyor screw rotatably mounted within said cylindrical housing having,
   (e) a central shaft having an integral helical rib,
   (f) a pulley fixed to said shaft driven from a source of power,
   (g) an upwardly facing longitudinally extending slot formed in said cylindrical housing,
   (h) and a cylindrical control valve rotatably mounted about the axis of said cylindrical housing and journaled on the periphery thereof for opening, closing and varying the size of said slot in said cylindrical housing,
   (i) a series of rotary elements on said frame positioned to form a cylindrical cotton roll box surrounding said ginned seed conveyor, including,
   (j) a gin saw cylinder below said ginned seed conveyor journaled on said frame having,
   (k) saws with saw teeth pointing in the direction of said gin saw cylinder rotation,
   (l) rotary ribs forming a rotary rib cylinder journaled on said frame and located to one side of said ginned seed conveyor having,
   (m) a plurality of axially spaced rotary rib discs interspaced with and overlapping said saw teeth of said gin saw cylinder wherein said saws and rotary ribs are closely axially spaced between each other a distance less than the outside width of the cotton seeds to prevent their passage between said rotary ribs,
   (n) a rotary huller rib cylinder journaled on said frame having,
   (o) a series of coaxially spaced rotary huller rib discs located below said ginned seed conveyor and overlapping said saws,
   (p) a plurality of overlapping rotary disc cylinders journaled on said frame and located above said rotary rib cylinder and radially outwardly spaced from said ginned seed conveyor and filling the area between said seed cotton drop and said rotary rib cylinder,
   (q) and a further plurality of rotary disc cylinders journaled on said frame and located above said rotary huller rib cylinder and radially outwardly spaced from and on the opposite side of said ginned seed conveyor from said rotary rib cylinder and said first mentioned plurality of rotary disc cylinders.

2. A rotary rib cotton gin comprising in combination:
   (a) a gin stand frame,
   (b) a seed cotton drop on said frame,
   (c) a ginned seed conveyor having a cylindrical housing fixed on said frame in horizontally disposed position so as to receive seed cotton dropped from said seed cotton drop down and around said conveyor including,
   (d) a conveyor screw rotatably mounted within said cylindrical housing having,
   (e) a central shaft having an integral helical rib,
   (f) a pulley fixed to said shaft driven from a source of power,
   (g) an upwardly facing longitudinally extending slot formed in said cylindrical housing,
   (h) and a cylindrical control valve rotatably mounted about the axis of said cylindrical housing and journaled on the periphery thereof for opening, closing and varying the size of said slot in said cylindrical housing,
   (i) a series of rotary elements on said frame positioned to form a cylindrical cotton roll box surrounding said ginned seed conveyor including,
   (j) a gin saw cylinder below said ginned seed conveyor journaled on said frame having,
   (k) saws with saw teeth pointing in the direction of said gin saw cylinder rotation,
   (l) rotary ribs forming a rotary rib cylinder journaled on said frame and located to one side of said ginned seed conveyor having,
   (m) a plurality of axially spaced rotary rib discs interspaced with and overlapping said saw teeth of said gin saw cylinder wherein said saws and rotary ribs are closely axially spaced between each other a distance less than the outside width of the cotton seeds to prevent their passage between said rotary ribs,
   (n) a rotary huller rib cylinder journaled on said frame having,
   (o) a series of axially spaced rotary huller rib discs located below said ginned seed conveyor and overlapping said saws,
   (p) a plurality of overlapping rotary disc cylinders journaled on said frame and located above said rotary rib cylinder and radially outwardly spaced from said ginned seed conveyor and filling the area between said seed cotton drop and said rotary rib cylinder,
   (q) a further plurality of rotary disc cylinders journaled on said frame and located above said rotary huller rib cylinder and radially outwardly spaced from and on the opposite side of said ginned seed conveyor from said rotary rib cylinder and said first mentioned plurality of rotary disc cylinders,
   (r) wherein one of said first mentioned rotary disc cylinders overlaps said rotary rib cylinder,
   (s) and wherein one of said further rotary disc cylinders overlaps said rotary huller rib cylinder.

3. A rotary rib cotton gin comprising in combination:
   (a) a gin stand frame,
   (b) a seed cotton drop on said frame,
   (c) a ginned seed conveyor having a cylindrical housing fixed on said frame in horizontally disposed position so as to receive seed cotton dropped from said seed cotton drop down and around said conveyor including, (d) a conveyor screw rotatably mounted within said cylindrical housing having,
(e) a central shaft having an integral helical rib,
(f) a pulley fixed to said shaft driven from a source of power,
(g) an upwardly facing longitudinally extending slot formed in said cylindrical housing,
(h) and a cylindrical control valve rotatably mounted about the axis of said cylindrical housing and journaled on the periphery thereof for opening, closing and varying the size of said slot in said cylindrical housing,
(i) a series of rotary elements on said frame positioned to form a cylindrical cotton roll box surrounding said ginned seed conveyor including,
(j) a gin saw cylinder below said ginned seed conveyor journaled on said frame having,
(k) saws with saw teeth pointing in the direction of said gin saw cylinder rotation,
(l) rotary ribs forming a rotary rib cylinder journaled on said frame and located to one side of said ginned seed conveyor having,
(m) a plurality of axially spaced rotary rib discs interspaced with and overlapping said saw teeth of said gin saw cylinder wherein said saws and rotary ribs are closely axially spaced between each other a distance less than the outside width of the cotton seeds to prevent their passage between said rotary ribs,
(n) a rotary huller rib cylinder journaled on said frame having,
(o) a series of axially spaced rotary huller rib discs located below said ginned seed conveyor and overlapping said saws,
(p) a plurality of overlapping rotary disc cylinders journaled on said frame and located above said rotary rib cylinder and radially outwardly spaced from said ginned seed conveyor and filling the area between said seed cotton drop and said rotary rib cylinder,
(q) a further plurality of rotary disc cylinders journaled on said frame and located above said rotary huller rib cylinder and radially outwardly spaced from and on the opposite side of said ginned seed conveyor from said rotary rib cylinder and said first mentioned plurality of rotary disc cylinders,
(r) and a further seed cotton drop on said frame located above said further plurality of rotary disc cylinders discharging down the opposite side thereof from said ginned seed conveyor,
(s) a huller breast sloping panel on said frame located adjacent the lower one of said further plurality of rotary disc cylinders and below said further seed cotton drop,
(t) a revolving spiked drum journaled on said frame below said rotary huller rib cylinder operatively located at the bottom of said huller breast sloping panel adapted to kick seed cotton against said gin saw cylinder whereby said rotary huller rib cylinder disc overlapping said saw teeth keep out burs and stems from passing through to the roll box area surrounding said ginned seed conveyor,
(u) and means on said frame for doffing ginned cotton from said gin saw teeth.

References Cited in the file of this patent
UNITED STATES PATENTS

| | | |
|---|---|---|
| 239,883 | Tate | Apr. 5, 1881 |
| 274,806 | Milburn | Mar. 27, 1883 |
| 393,352 | Brady | Nov. 27, 1888 |
| 1,767,894 | Petty et al. | June 24, 1930 |